United States Patent [19]
Hitomi

[11] Patent Number: 5,855,328
[45] Date of Patent: Jan. 5, 1999

[54] SPINNING REEL WITH BUSHING FOR SUPPORTING SPOOL SHAFT

[75] Inventor: Yasuhiro Hitomi, Hashimoto, Japan

[73] Assignee: Shimano, Inc., Japan

[21] Appl. No.: 962,914

[22] Filed: Oct. 27, 1997

Related U.S. Application Data

[63] Continuation of Ser. No. 553,845, Nov. 6, 1995, abandoned.

[30] Foreign Application Priority Data

Nov. 11, 1994 [JP] Japan ................................ 6-278046

[51] Int. Cl.$^6$ .................................................. A01K 89/02
[52] U.S. Cl. .......................................................... 242/245
[58] Field of Search ............................................. 242/245

[56] References Cited

U.S. PATENT DOCUMENTS

| | | | |
|---|---|---|---|
| 2,548,073 | 4/1951 | Siegrist | 242/245 X |
| 4,776,526 | 10/1988 | Saito | 242/245 |
| 5,511,735 | 4/1996 | Kaneko | 242/245 |

*Primary Examiner*—Donald P. Walsh
*Assistant Examiner*—Emmanuel M. Marcelo
*Attorney, Agent, or Firm*—Jeffer, Mangels, Butler & Marmaro LLP

[57] ABSTRACT

A spinning reel adapted to be mounted on a fishing rod includes a reel body; a handle; a master gear; a pinion gear engaged with the master gear and rotated by the handle; a rotor that rotates integrally with the pinion gear; a spool; and a spool shaft. The spool shaft includes a shaft portion that is fixed to the spool and extends rearward from the spool through the pinion gear, the shaft portion having a rear end and a diameter, and a sliding portion that is connected to the rear end of the shaft portion and has a diameter that is larger than the diameter of the shaft portion. The reel further includes a rear drag mechanism including a bushing that is rotatably supported relative to the reel body and that supports the sliding portion such that the sliding portion cannot undergo rotation relative to the bushing but can move in the axial direction, and frictional engagement mechanism for preventing the bushing from rotating relative to the reel body by frictional engagement.

20 Claims, 6 Drawing Sheets

SPINNING REEL WITH BUSHING FOR SUPPORTING SPOOL SHAFT

This application is a continuation, of application Ser. No. 08/553,845, filed Nov. 6, 1995 now abandoned.

FIELD OF THE INVENTION

The present invention relates to a spinning reel, and in particular to a spinning reel with a bushing that supports a spool shaft for relative rotation.

BACKGROUND OF THE INVENTION

A spinning reel generally comes with a reel assembly, a rotor that is rotatably supported by this reel assembly, and a spool around which the fishing line is wound. A spinning reel is further equipped with a drag mechanism that fixes the spool such that it cannot rotate relative to the reel assembly, but at the same time does permit the spool to rotate when at least a certain force is applied. With a rear drag type of spinning reel in which the drag mechanism is provided to the rear portion of the reel assembly, a spool shaft that is fixed to the spool extends toward the rear, goes through a pinion gear, and the rear end thereof extends into the drag mechanism, where it is supported by the bushing of the drag mechanism such that relative rotation is impossible but it is free to move in the axial direction. The bushing of the drag mechanism is designed so that it can be frictionally engaged with the reel assembly.

A specific gap between the spool shaft and the bushing is generally required with a spinning reel in order for the spool shaft to move back and forth during reeling of the line. This gap tends to result in chatter of the spool shaft in its direction of rotation with respect to the bushing. When the spool chatters, the feel of the product suffers during handle operation and so on.

An object of the present invention is to reduce chatter in the spool rotation direction.

SUMMARY OF THE PREFERRED EMBODIMENTS

In accordance with one aspect of the present invention, there is provided an improved spinning reel. The spinning reel is adapted to be mounted to a fishing rod and is equipped with a reel body, a master gear, a pinion gear, a rotor, a spool, a spool shaft, and a drag mechanism. The reel body has a handle and can be mounted on a fishing rod. The master gear rotates integrally with the handle. The pinion gear is rotatably supported at the front portion of the reel body, and is rotated by the handle through engagement with the master gear. The rotor rotates integrally with the pinion gear. The spool is positioned at the front portion of the rotor. The spool shaft has a shaft portion that is fixed to the spool and extends rearward from the spool through the pinion gear and a sliding portion that is provided to the rear end of the shaft portion and has a larger diameter than the shaft portion. The drag mechanism has a bushing that is rotatably supported relative to the reel body and that supports the sliding portion such that it cannot undergo relative rotation but can move in the spool shaft direction, and a frictional engagement member that is used to prevent the bushing from rotating relative to the reel body by means of frictional engagement.

According to the invention, a sliding portion whose diameter is larger than that of the shaft portion of the spool is fixed at the rear portion of the shaft portion, and this sliding portion is supported such that it cannot rotate relative to the bushing but can move along the spool shaft. A gap in the diameter direction is maintained between the sliding portion and the bushing so that these two elements will be able to slide relative to each other. As a result, there is play in the circumferential direction even though the two elements are linked so that they cannot rotate relative to each other. When a gap of at least 1 mm is required, for example, this play will be smaller in terms of angle when the play is at a position of larger diameter than when it is at a position of smaller diameter.

Because the sliding portion has a larger diameter than the shaft portion, there is less "chatter" of the spool shaft in its direction of rotation than with a conventional case in which a spool shaft with a small diameter is supported by a bushing. Furthermore, since the diameter of the 3 portion of the spool shaft can be the same as in previous reels, there is no need to increase the diameter of the pinion gear through which the spool shaft passes.

In a preferred embodiment, the shaft portion and the sliding portion comprise separate members fixed such that relative rotation is impossible. Sliding can be made smoother by employing, for example, a portion whose coefficient of friction with the bushing is low.

In another preferred embodiment, the shaft portion and the sliding portion are fixed such that they can be inclined with respect to each other. Positional shifts in a diagonal direction thus can be adjusted in cases in which, for example, the shaft portion is inserted on a bias with respect to the bushing.

In still another preferred embodiment, the bushing has defined therein a through-hole in the axial direction within which the sliding member is fixed. The through-hole preferably has a polygonal cross-section, in particular an octagonal cross-section, and the sliding member has a similar polygonal cross-section. Particularly preferably, the through-hole in the bushing has formed therein a pair of grooves extending in the axial direction, and the sliding portion is a pin which is affixed to the rear portion of the spool shaft and engages the pair of grooves.

In a further preferred embodiment, the sliding portion has defined therein a tapered hole whose diameter increases outwardly, and the rear of the spool shaft is fixed to the sliding portion by means of a pin inserted into the tapered hole.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

In the figures, like elements are labeled alike throughout.

DETAILED DESCRIPTION OF THE PREFERRED EMBODIMENTS

Figure 1:
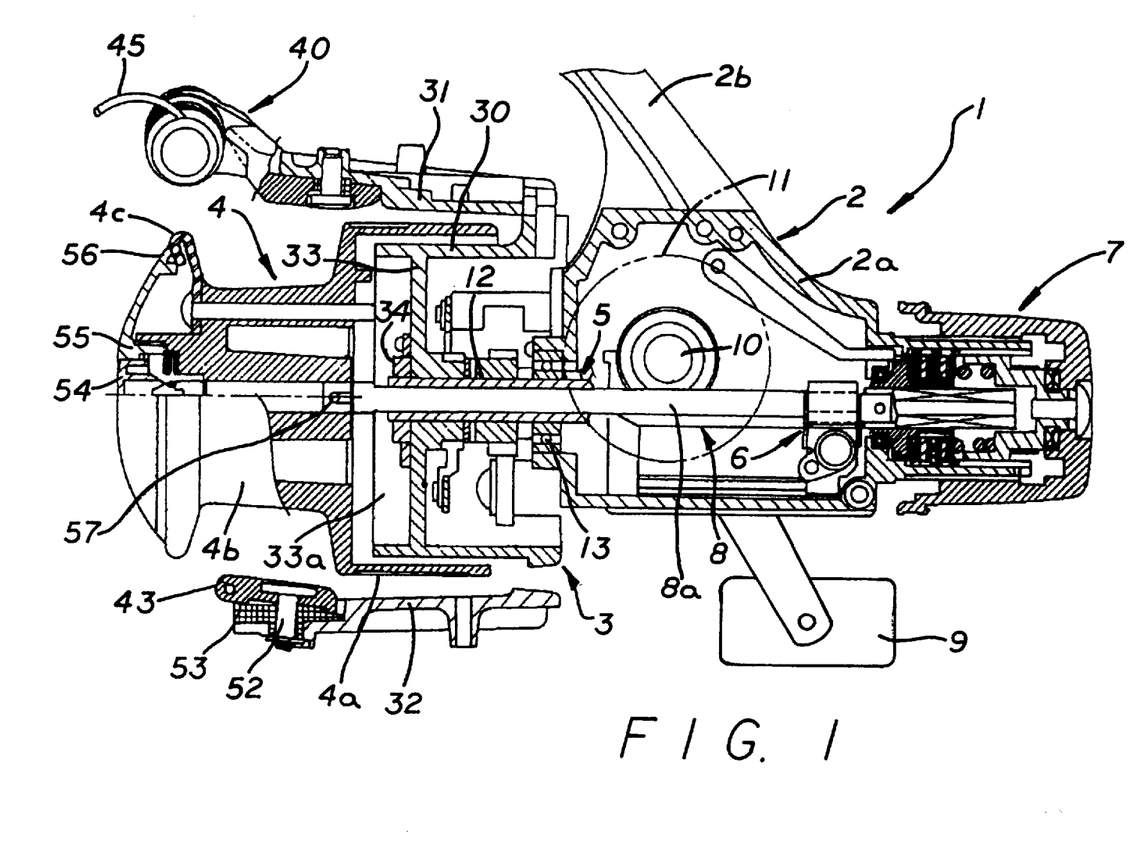
FIG. 1 is a simplified vertical cross section of the spinning reel in one practical example of the present invention.

Referring to FIG. 1, spinning reel 1 includes a reel body 2 having a handle 9, a rotor 3 that is rotatably supported at the front portion of the reel body 2, and a spool 4 that is positioned at the front portion 3a of the rotor 3 and is used to wind the fishing line.

The reel body 2 has a body portion 2a, at the upper part of which is formed an attachment portion 2b that is used to attach the spinning reel 1 to a fishing rod. The interior of the body portion 2a is provided with a rotor drive mechanism 5 that is used to rotate the rotor 3, and with a level winding drive mechanism 6 that is used to wind fishing line uniformly onto the spool 4 by movement of the spool 4 back and forth along the axis of rotation. A rear drag mechanism 7 is provided at the rear of the body portion 2a of the reel body 2. A spool shaft 8, including a shaft portion 8b is fixed to the spool 4 and extends rearward such that it passes through the rotor 3 and the body portion 2a, and its rear end portion engages with the rear drag mechanism 7 (discussed below).

The rotor drive mechanism 5 has a master gear 11 that rotates along with a shaft 10 to which is fixed a handle 9, and a pinion gear 12 (the teeth of which are not depicted) that engages with this master gear 11. The pinion gear 12 is formed in the shape of a cylinder, the front portion of which extends through the center of the rotor 3 toward the spool 4 side. The pinion gear 12 is rotatably supported by a ball bearing 13 that is supported by the body portion 2a. The spool shaft 8 passes through the central portion of the pinion gear 12 along the rotational axis such that it can move back and forth. A specific gap is maintained between the inside diameter of the pinion gear 12 and the outside diameter of the spool shaft 8.

The level winding drive mechanism 6 is a mechanism that transmits the rotation of the shaft 10 to the spool shaft 8 in the form of back-and-forth motion. Such level winding drive mechanisms are familiar to those skilled in the art and are not further described.

The rotor 3 has a cylinder 30, and a first arm 31 and a second arm 32 that are provided on either side of the cylinder 30 opposite one another. The cylinder 30 preferably is molded integrally with the arms 31 and 32. Optionally, the cylinder 30 and the arms 31 and 32 can be formed separately and then joined together. A front wall 33 is formed at the front portion of the cylinder 30, and a boss 33a is formed in the center of this front wall 33. A through-hole is formed in the center of this boss 33a, and the spool shaft 8 and the front portion of the pinion gear 12 pass through this through-hole. The tip of the pinion gear 12 that passes through the front wall 33 is threaded, and a nut 34 is threaded onto these threads. The pinion gear 12 and the rotor 3 are fixed such that they cannot rotate relative to each other.

A first bale support member 40 is swingably attached on the inside of the tip (forward side) of the first arm 31, and a second bale support member 43 is swingably attached on the inside of the tip of the second arm 32. As is clear from FIG. 1, the first bale support member 40 extends at an angle to the outside with respect to the first arm 31, and the second bale support member 43 extends at an angle to the inside with respect to the second arm 32. Specifically, the swing axis of each of the bale support members 40 and 43 is diagonal, rather than perpendicular, to the rotational axis.

Figure 2:
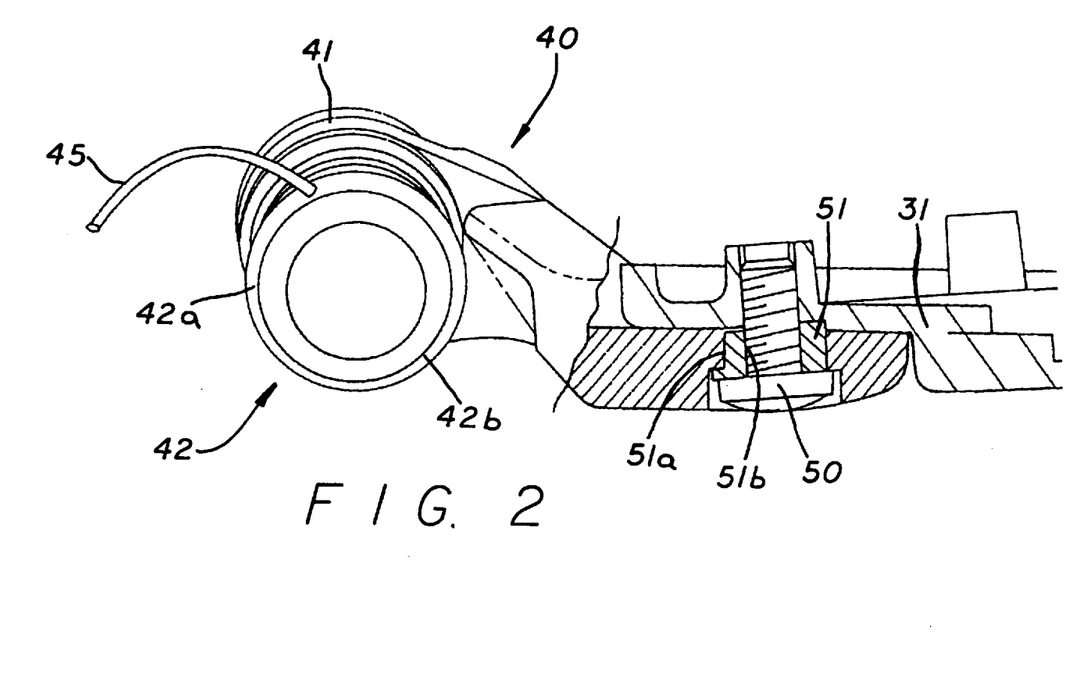
FIG. 2 is an oblique view and partial cross section of the first bale support member.

As shown in detail in FIG. 2, the base portion of the first bale support member 40 is swingably supported by a fixing collar 51. The fixing collar 51 is fixed to the first arm 31 by a machine screw 50. The fixing collar 51 has a support face 51a that supports the first bale support member 40, and a hole 51b through which the screw 50 passes. The support face 51a is parallel to the swing axes of the first bale support members 40 and 43, and the hole 51b is formed perpendicular to the rotational axis. The second bale support member side has a similar construction, where a fixing collar 53 and a fastening screw 52 are used.

This use of fixing collars makes it possible to use conventional molds for manufacturing a rotor without any modification even when the swing axis is at an angle to the rotational axis.

Figure 3:
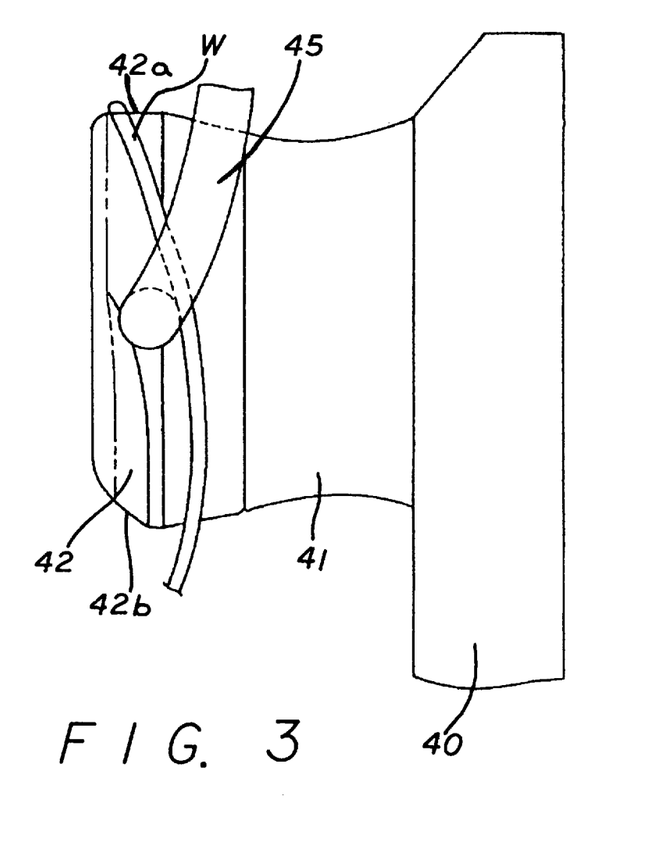
FIG. 3 is a side view of the line roller.
Figure 4:
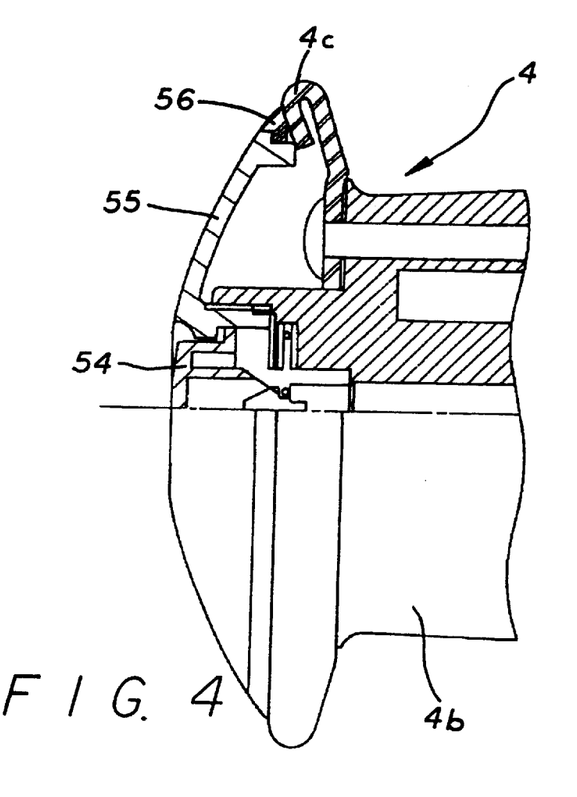
FIG. 4 is a partial vertical cross section of the spool 4.

A line roller 41 that is used to guide the fishing line onto the spool 4 is mounted on the tip of the first bale support member 40. As shown in FIG. 3, an arm fixing shaft cover 42 whose diameter is larger than the roller portion is provided to the inside of the line roller 41. A bale 45 extends from the arm fixing shaft cover 42 to the second bale support member 43. The peripheral portion on the inside (the spool 4 side) of the arm fixing shaft cover 42 consists of a flat surface 42a that is not beveled. The inner rear portion of the arm fixing shaft cover 42 consists of a slanted bevel portion 42b, which prevents the spool 4 from coming into contact with a bent flange 4c (discussed below).

The spool 4 is positioned between the first arm 31 and the second arm 32 of the rotor 3. As shown in FIG. 1, this spool 4 has a cylindrical skirt 4a formed on the rear end side, a winding drum 4b formed on the forward side of the skirt 4a, and a bent flange 4c that is fixed to the tip of the winding drum 4b. The peripheral side of the bent flange 4c is bent toward the inside. The cylinder 30 of the rotor 3 is positioned on the inside of the skirt 4a. The tip of the spool shaft 8 is inserted into the center of the winding drum 4b, and the spool 4 and the spool shaft 8 are fixed by a pin 57. The tip of the spool shaft 8 protrudes from the winding drum 4b. A one-touch button 54 is mounted at the tip of this spool shaft 8. A one-touch button collar 55 is positioned around the one-touch button 54. The one-touch button collar 55 threads onto the winding drum 4b of the spool 4 to stop the one-touch button 54. A collar ring 56 is inserted between the one-touch button collar 55 and the bent portion of the bent flange 4c. This collar ring 56 is made from an elastic material, and fishing line [weight] numbers are written on its surface in the circumferential direction. A mark such as a "D," for example, is also made on the peripheral side surface of the one-touch button collar 55. This allows the collar ring 55 to be rotated until the number of the line currently being used lines up with the D mark, so there is no need to remember the weight of the line. Since the collar ring 56 is installed with its elastic material compressed, there is no gap between the one-touch button collar 55 and the bent flange 4c, which prevents the line from being pinched between these components.

Figure 5:
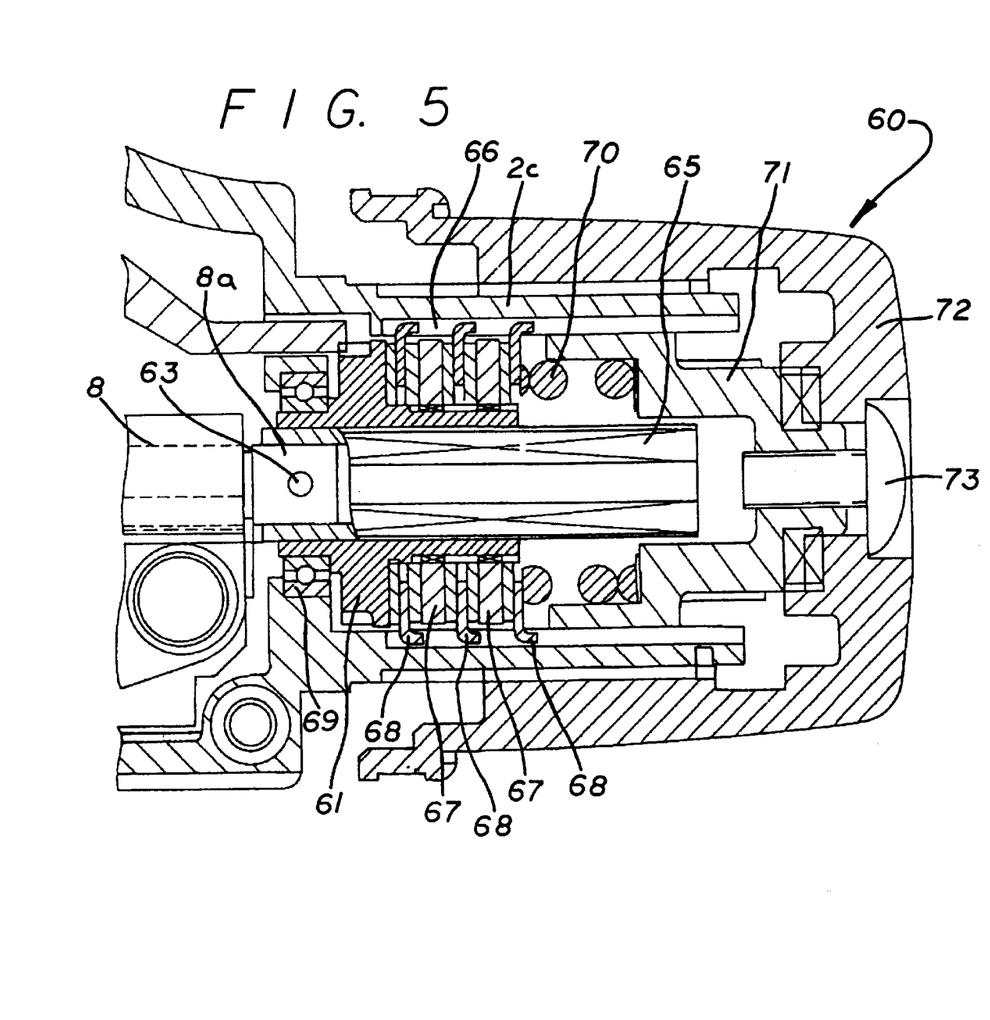
FIG. 5 is a vertical cross section of the rear drag mechanism.

The rear drag mechanism 7 shown in detail in FIG. 5 includes a cylindrical bushing 61. Frictional engagement member 66 includes a plurality of first friction plates 67 and a plurality of second friction plates 68, for example two first friction plates 67 and three second friction plates 68. Rear drag mechanism 7 further includes a coil spring 70 which is used for imparting friction, a support member 71, and a fixing cap 72. The bushing 61 is rotatably supported by ball bearing 69 at the rear portion of the reel body 2. Through-hole 61a in the center of the bushing 61 has an octagonal cross section, and sliding portion 65 (FIG. 6) of the spool shaft 8 is inserted in this hole with a specific gap such that relative rotation is impossible. Sliding portion 65 is cylindrical, into the interior of which is inserted the assembly rear end 8a of the shaft portion 8b of spool shaft 8, and these two are fixed by a pin 63 such that relative rotation is impossible.

A spline is formed around the rear portion of the bushing 61, and this spline is engaged with the inner periphery of the first friction plates 67. The two first friction plates 67 and three second friction plates 68 are arranged alternately. The second friction plates 68 are engaged at their outer periphery with a spline groove formed on the inside of a cylindrical protrusion 2c formed at the rear of the body portion 2a. The coil spring 70 supported by the cylindrical support member 71 urges the first friction plates 67 and the second friction plates 68 against each other. As a result, the bushing 61 cannot undergo relative rotation with respect to the reel body 2 due to frictional engagement. The fixing cap 72 is threaded from the outside over thread grooves formed around the outside of the cylindrical protrusion 2c, and stops the support member 71 at a specific position. Thus, adjustment of the tightening of the fixing cap 72 allows the pressing force onto the plates that make up the frictional engagement member 66 to be varied, and makes possible the adjustment of drag force. The fixing cap 72 is fixed by a bolt 73 to the support member 71.

The operation of a practical example will now be described, focusing primarily on the line reeling operation.

When the line is being reeled in, the bale 45 is thrown to the line retrieving position. When the handle 9 is rotated in this state, this rotational force is transmitted to the pinion gear 12 via the shaft 10 and the master gear 11. The torque that is transmitted to the pinion gear 12 is transmitted to the rotor 3 via the front portion of the pinion gear 12. Meanwhile, the torque of the shaft 10 is converted by the level winding drive mechanism 6 into back-and-forth motion with respect to the spool shaft 8. Specifically, the spool 4 undergoes reciprocal movement. As a result, the line that has been guided to the spool 4 by the bale 45 and the line roller 41 is uniformly wound back and forth over the winding drum 4b.

As shown in FIG. 3, the line W comes from the inside of the arm fixing shaft cover 42 to the first bale support member 40. This line W extends through the unbeveled cylinder surface 42a portion, so it is able to move smoothly to the line roller 41 side without snagging.

The operation of the rear drag mechanism 7 will now be described.

When a fish pulls strongly on the line W when the handle 9 is turned and the line reeled in, the spool 4 attempts to rotate in response to this force. This force is transmitted to the bushing 61 via the spool shaft 8. When this force exceeds the frictional force of the frictional engagement member 66, the spool 4 begins to rotate.

Figure 6:
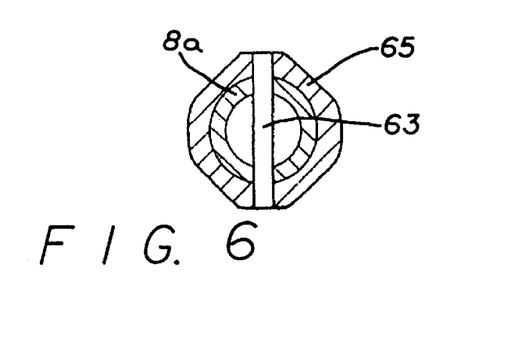
FIG. 6 is a vertical cross section of the sliding member.

Here, a specific gap is maintained in the diameter direction between the sliding portion 65 and the bushing 61 in order for the two to be able to slide relative to each other. Consequently, movement, or "play," in the circumferential direction occurs even though the two components are unable to undergo relative rotation. This play is believed to remain nearly constant regardless of the diameter. However, if we think in terms of angular play, there is a difference between when this play occurs in a position where the diameter is large and when it occurs in a position where the diameter is small. Specifically, when there is play in a position where the diameter is large, this play will be smaller in terms of angle than when the same play occurs in a position where the diameter is small.

As is clear from the above, since the sliding portion 65 has a larger diameter than the shaft portion in this example, there is less chatter (motion back and forth) of the spool shaft 8 in the circumferential direction than in a conventional case in which the spool shaft was supported directly by a bushing.

Because the shaft portion of the spool shaft 8 and the sliding portion 65 are separate members, a material whose coefficient of friction with the bushing 61 is low can be used for the sliding member, and as a result the spool shaft 8 will slide more smoothly.

Also, since the bushing 61 is supported on the reel body 2 by ball bearing 69, uneven rotation of the bushing 61 is minimized.

Furthermore, the provision of the sliding portion 65 to the spool shaft 8 obviates the need for a larger diameter for the spool shaft 8 as a whole. If the overall diameter of the spool shaft 8 is increased, then the pinion gear 12 must also be made larger.

Figure 7:
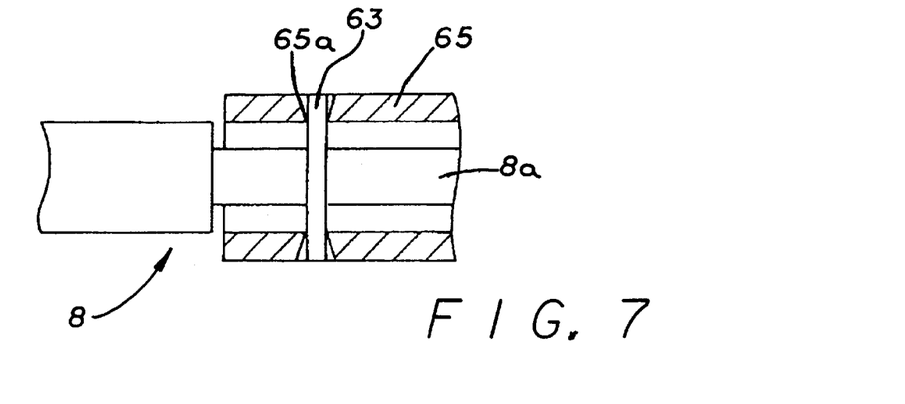
FIG. 7 is a vertical cross section of the fixing of the spool shaft and the sliding member in another practical example.

The spool shaft 8 and the sliding portion 65 may be fixed such that they can be inclined with respect to each other. In the example shown in FIG. 7, a tapered hole 65a whose diameter increases outward is formed in the sliding portion 65. The assembly rear end 8a of the spool shaft 8 is positioned with a gap between itself and the center hole in the sliding portion 65. A pin 63 is fixed to the assembly rear end 8a of the spool shaft 8, and is inserted into the tapered hole 65a of the sliding portion 65. In this case, even if the spool shaft 8 is inserted on a bias with respect to the bushing 61, the positional shift in the diagonal direction can be adjusted by deflection of the shaft portion with respect to the sliding portion 65.

The sliding portion may optionally comprise a pin. In the example shown in FIGS. 8 and 9, the sliding portion 165 is a pin that is fixed to the rear end 8a of the spool shaft 8. A through-hole 161a whose diameter is larger than that of the rear end 8a is formed in the 3 bushing 161. In this through-hole 161a are formed two grooves 161b, with ends 161c, that extend in the axial direction and in which the ends of the sliding portion 165 are inserted. The engagement between the sliding portion 165 and the grooves 161b results in the assembly rear end 8a being supported such that it can slide in the axial direction with respect to the bushing 161 but cannot undergo relative rotation. The width of the grooves 161b that is the distance between ends 161c in the transverse direction, is greater than the length of the sliding portion 165, and as a result the sliding portion 165 and the assembly rear end 8a are able to move relatively in the up-and-down direction of the figure with respect to the bushing 161.

Figure 8:
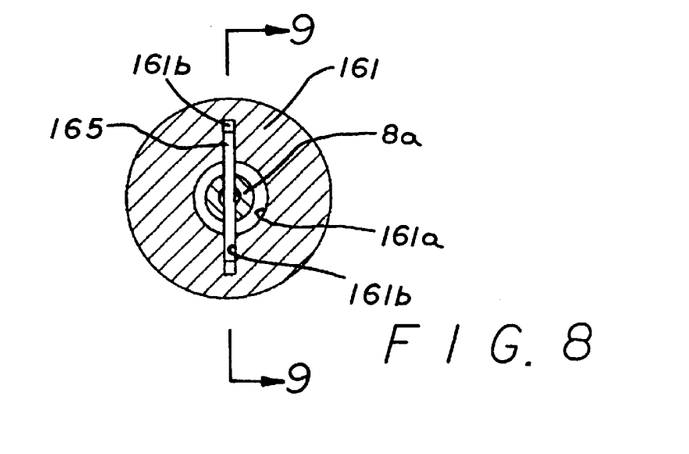
FIG. 8 is a vertical cross section of the engagement of the spool shaft and the bushing in another practical example.
Figure 9:
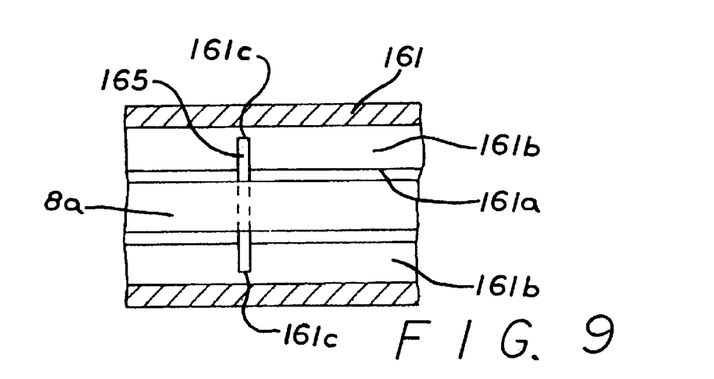
FIG. 9 is a cross section along the IX—IX line in FIG. 8.

In this example, in addition to the merits of the above practical example, the sliding portion 165 can undergo relative movement and positional shift in the diameter direction can be adjusted even if the rear end 8a is misaligned in the up-and-down direction of the figure with respect to the bushing 161.

The present invention can also be employed for a spinning reel in which the drag mechanism and the spool shaft are not concentric.

What is claimed is:

1. A spinning reel adapted to be mounted on a fishing rod, said spinning reel comprising:
   (a) a reel body having a front portion and a rear portion;
   (b) a handle;
   (c) a master gear that rotates integrally with said handle;
   (d) a pinion gear that is rotatably supported in said front portion of said reel body, engaged with said master gear and rotated by said handle;
   (e) a rotor that rotates integrally with said pinion gear, said rotor having a front portion;
   (f) a spool that is positioned in said front portion of said rotor;
   (g) a spool shaft comprising
      (i) a shaft portion that is fixed to said spool and extends rearward from said spool through said pinion gear, said shaft portion having a rear end and a diameter, and
      (ii) a sliding portion that is connected,,,to said rear end of said shaft portion and has a diameter that is larger than said diameter of said shaft portion; and
   (h) a rear drag mechanism comprising
      (i) a bushing that is rotatably supported relative to said reel body and that supports said sliding portion such that said sliding portion cannot undergo rotation relative to said bushing but is adapted to move in the axial direction, and
      (ii) frictional engagement means for preventing said bushing from rotating relative to said reel body by frictional engagement.

2. The spinning reel as defined in claim 1, wherein said shaft portion and said sliding portion comprise separate members fixed such that relative rotation therebetween is impossible.

3. The spinning reel as defined in claim 2, wherein said sliding portion is a cylinder having an interior, and said shaft portion is inserted into said interior of said sliding portion and secured therein by a pin.

4. The spinning reel as defined in claim 2, wherein said shaft portion and said sliding portion are fixed such that they can be inclined with respect to each other.

5. The spinning reel as defined in claim 4, wherein said sliding portion has defined therein a hole in the transverse direction, said hole having a diameter that increases outwardly, and wherein said rear of said spool shaft is fixed to said sliding portion by means of a pin inserted into said hole.

6. The spinning reel as defined in claim 1, wherein said bushing has defined therein a through-hole in the axial direction within which said sliding portion is disposed.

7. The spinning reel as defined in claim 6, wherein said through-hole in said bushing has a polygonal cross-section, and said sliding portion has a similar polygonal cross-section.

8. The spinning reel as defined in claim 7, wherein said bushing has an octagonal cross-section.

9. The spinning reel as defined in claim 6, wherein said through-hole in said bushing has formed therein a pair of grooves extending in the axial direction, and said sliding portion is a pin which is affixed to the rear portion of said spool shaft and engages said pair of grooves.

10. The spinning reel as defined in claim 9, wherein said pin has a length, and said grooves each have an end and a width in the transverse direction, wherein the total distance between said ends of said grooves in the transverse direction is greater than said length of said pin.

11. The spinning reel as defined in claim 1, wherein said bushing and said sliding portion are comprised of different materials.

12. The spinning reel as defined in claim 1, wherein said bushing is supported on said reel body by ball bearings.

13. The spinning reel as defined in claim 12, wherein said bushing has defined therein a through-hole in the axial direction within which said sliding portion is disposed, and wherein said through-hole in said bushing has formed therein a pair of grooves extending in the axial direction, and said sliding portion is a pin which is affixed to the rear portion of said spool shaft and engages said pair of grooves.

14. The spinning reel as defined in claim 13, wherein sad pin has a length, and said grooves each have an end and a width in the transverse direction, wherein the total distance between said ends of said grooves in the transverse direction is greater than said length of said pin.

15. The spinning reel as defined in claim 1, wherein said frictional engagement means comprise
   (i) a plurality of first friction plates which are affixed to said bushing,
   (ii) a plurality of second friction plates which are affixed to said rear portion of said reel body and are arranged alternately with said plurality of first friction plates, and
   (iii) a coil spring which urges said pluralities of first and second friction plates together.

16. The spinning reel as defined in claim 15, wherein said frictional engagement means further comprise means for adjusting said coil spring.

17. The spinning reel as defined in claim 15, wherein said bushing has defined therein a through-hole in the axial direction within which said sliding portion is disposed, and wherein said through-hole in said bushing has formed therein a pair of grooves extending in the axial direction, and said sliding portion is a pin which is affixed to the rear portion of said spool shaft and engages said pair of grooves.

18. The spinning reel as defined in claim 17, wherein said pin has a length, and said grooves each have an end and a width in the transverse direction, wherein the total distance between said ends of said grooves in the transverse direction is greater than said length of said pin.

19. A spinning reel comprising:
   (a) a reel body;
   (b) a rotor having a front portion;
   (c) a spool affixed to said front portion of said rotor;
   (d) a spool shaft comprising
      (i) a shaft portion that is fixed to said spool and extends rearward from said spool, said shaft portion having a rear end and a diameter, and
      (ii) a sliding portion that is connected to said rear end of said shaft portion and has a diameter that is larger than said diameter of said shaft portion; and
   (e) a rear drag mechanism comprising
      (i) a bushing that is rotatably supported relative to said reel body and that supports said sliding portion such that said sliding portion cannot undergo rotation relative to said bushing but is adapted to move in the axial direction, and
      (ii) frictional engagement means for preventing said bushing from rotating relative to said reel body by frictional engagement.

20. A spinning reel adapted to be mounted on a fishing rod, said spinning reel comprising:
   (a) a reel body having a front portion and a rear portion;
   (b) a handle;

(c) a master gear that rotates integrally with said handle;

(d) a pinion gear that is rotatably supported in said front portion of said reel body, engaged with said master gear and rotated by said handle;

(e) a rotor that rotates integrally with said pinion gear, said rotor having a front portion;

(f) a spool that is positioned in said front portion of said rotor;

(g) a spool shaft comprising
  (i) a shaft portion that is fixed to said spool and extends rearward from said spool through said pinion gear, said shaft portion having a rear end and a diameter, and
  (ii) a sliding portion that is connected to said rear end of said shaft portion and has a diameter that is larger than said diameter of said shaft portion; and (h) a rear drag mechanism comprising
(i) a bushing that is rotatably supported on said reel body by ball bearings and that supports said sliding portion such that said sliding portion cannot undergo rotation relative to said bushing but is adapted to move in the axial direction, and
(ii) frictional engagement means for preventing said bushing from rotating relative to said reel body by frictional engagement, said frictional engagement means comprising
  (A) a plurality of first friction plates which are affixed to said bushing,
  (B) a plurality of second friction plates which are affixed to said rear portion of said reel body and are arranged alternately with said plurality of first friction plates, and
  (C) a coil spring which urges said pluralities of first and second friction plates together.

* * * * *